3,261,752
METHOD FOR REDUCING SERUM CHOLESTEROL

Dale D. J. Chodos, Portage, Mich., assignor to The Upjohn Company, Kalamazoo, Mich., a corporation of Delaware
No Drawing. Filed Mar. 2, 1964, Ser. No. 348,836
2 Claims. (Cl. 167—65)

This invention relates to a method for reducing the serum cholesterol content of non-hyperglycemic subjects.

Tolbutamide, a highly effective hypoglycemic agent, has been reported to be substantially ineffective in reducing serum cholesterol content in non-diabetic subjects (Waddell, Proc. Soc. Exper. Biol. and Med., 98: 280 [1958] despite the observations of such activity in diabetic subjects (Berkowitz, Diabetes 2 [Supp.]:56 [1962]; Hills et al., ibid., page 61; Shipp et al., ibid., page 69). However, it has now been discovered that the active hypoglycemic agent 1 - (hexahydro - 1 - azepinyl)-3-p-tolylsulfonylurea (U.S. Patent No. 3,063,903) of the formula

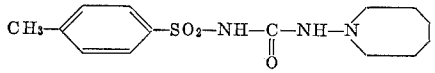

and acid addition salts thereof, such as the hydrochloride, sulfate, hydrobromide, phosphate, tartrate, acetate, citrate, succinate, maleate, benzoate, salicylate, and the like, will substantially reduce the serum cholesterol content of non-hyperglycemic subjects and provide effective control of hypercholesteremia.

In general, dosage of from about 50 to about 1000 mg. per day of 1-(hexahydro-1-azepinyzl)-3-p-tolylsulfonyl-urea in single or divided doses is adequate for significantly reducing elevated serum cholesterol levels in non-diabetic humans by either the oral or intravenous routes. Administration should in all cases be in conjunction with meals in order to avoid excessive concomitant reduction of blood sugar levels. If desired, standard oral and intravenous formulations can be supplemented with lactose or the like as a compensatory sugar source. Cholesterol reduction has been demonstrated in humans and animals at widely varying doses, and satisfactory dosage schedules must be developed on the basis of individual responses.

In selecting hypercholesteremic subjects for treatment by the method of this invention, those having elevated blood sugar levels as determined by the standard glucose tolerance test (Conn et al., Am. J. Med., 31: 839 [1961]) should be excluded. The present invention is therefore directed specifically to achieving reduction in serum cholesterol levels through administration of 1-(hexahydro-1-azepinyl)-3-p-tolylsulfonylurea or its acid addition salts in hypercholesteremic subjects reacting within normal limits to the glucose tolerance test or otherwise known to be free of hyperglycemia.

The following examples illustrate the operation of this invention and demonstrate the action of the active ingredients hereof in achieving serum cholesterol reduction.

EXAMPLE 1

Using a modified Phillips procedure (Phillips et al., Proc. Soc. Exper. Biol. and Med., 112: 233 [1963]) with appropriate controls, standard Sprague-Dawley male rats were given 1-(hexahydro-1-azepinyl)-3-p-tolylsulfonyl-urea in 0.25% aqueous methyl cellulose solution. The animals were pre-treated with Triton WR–1339 (p-isooctylpolyoxyethylenephenol polymer), a surface active agent widely used for establishing elevated cholesterol levels in test animals. Results, statistically analyzed, were as follows:

| Dose, mg./kg. | Serum Sterols | |
|---|---|---|
| | Mg. Percent— S.D.[1] | Percent of Control |
| Test A: | | |
| Control | 123±29 | |
| 800 | 80± 5 | [2] 65 |
| 400 | 90±12 | [2] 73 |
| 200 | 93±16 | [2] 75 |
| 50 | 102±25 | [3] 83 |
| Test B: | | |
| Control | 119±25 | |
| 200 | 100±11 | [3] 84 |
| 100 | 104±15 | 87 |
| 50 | 118±12 | 98 |
| Test C: | | |
| Control | 162±39 | |
| 200 | 115±16 | [2] 71 |
| 100 | 142±41 | 88 |
| 50 | 148±14 | 91 |
| Test D: | | |
| Control | 165±43 | |
| 800 | 111±20 | [2] 67 |
| 400 | 109±16 | [2] 66 |
| 200 | 78±16 | [2] 47 |
| 100 | 125±14 | [3] 76 |

[1] Standard deviation.
[2] Significant with 95% confidence limits.
[3] Significant with 90% confidence limits.

EXAMPLE 2

Tablets

A lot of 10,000 compressed tablets, each containing 100 mg. of 1-(hexahydro-1-azepinyl)-3-p-tolylsulfonylurea, is prepared from the following ingredients:

| | Gm. |
|---|---|
| 1-(hexahydro-1-azepinyl)-3-p-tolylsulfonylurea | 1000 |
| Terra alba (calcium sulfate) | 1500 |
| Methylcellulose, USP (15 cps.) | 40 |
| Talc, bolted | 250 |
| Calcium stearate, fine powder | 35 |

The 1 - (hexahydro - 1-azepinyl)-3-p-tolylsulfonylurea and terra alba are mixed well, granulated with 7.5% solution of methylcellulose in water, passed through a No. 8 screen and dried at 120° F. The dried granules are passed through a No. 12 screen, mixed thoroughly with the talc and stearate and compressed into tablets.

One tablet is given three times daily in the oral treatment of hypercholesteremia in adult humans.

Supplementary ingredients comprising conventional therapeutic amounts or less of other hypocholesteremic agents, such as nicotinic acid, the D-isomer of 3,5,3'-triiodothyronine, triiodothyropropionic acid, and thyroxine-like compounds such as sodium L-thyroxine and sodium D-thyroxine can also be included in therapeutic formulations.

What is claimed is:
1. A method for reducing elevated serum cholesterol levels in non-hyperglycemic subjects which comprises: administering a compound selected from the group consisting of 1-(hexahydro-1-azepinyl)-3-p-tolylsulfonylurea and acid addition salts thereof to said non-hyperglycemic subjects.
2. A method for reducing elevated serum cholesterol levels in non-hyperglycemic subjects which comprises: administering from about 50 to about 1000 mg. of 1-(hexahydro-1-azepinyl)-3-p-tolylsulfonylurea to said subjects reacting within normal limits to the glucose-tolerance test.

No references cited.

JULIAN S. LEVITT, *Primary Examiner.*
MARTIN J. COHEN, *Assistant Examiner.*